June 25, 1963  D. G. BRAKE  3,095,475
SMOOTHING SPATIALLY DISCONTINUOUS IMAGES
Filed Sept. 14, 1960  5 Sheets-Sheet 1
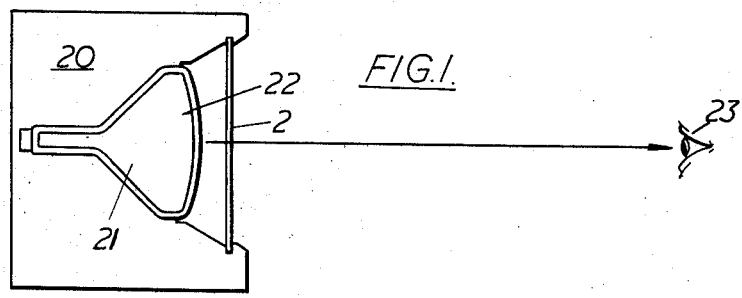
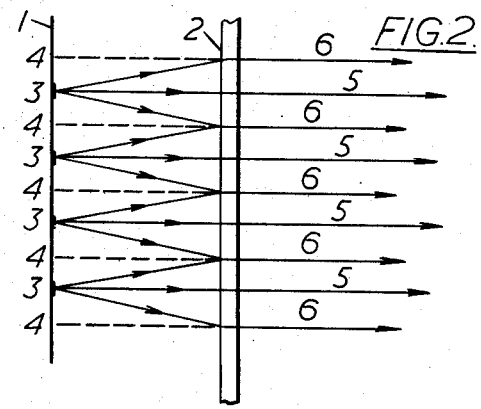
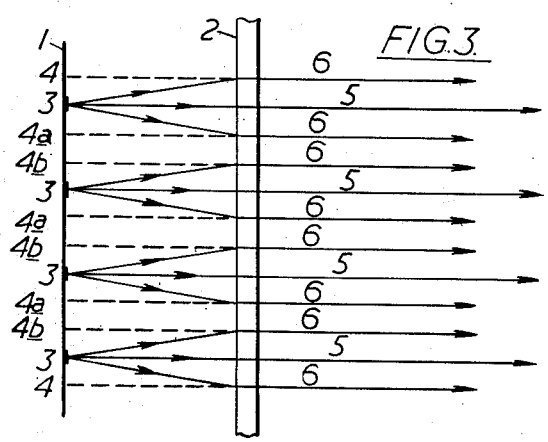
Inventor
David George Brake
by Roberts, Cushman + Grover
Attorney June 25, 1963  D. G. BRAKE  3,095,475
SMOOTHING SPATIALLY DISCONTINUOUS IMAGES
Filed Sept. 14, 1960  5 Sheets-Sheet 2

Inventor
David George Brake
by Roberts Cushman & Grover
Attorney

June 25, 1963 D. G. BRAKE 3,095,475
SMOOTHING SPATIALLY DISCONTINUOUS IMAGES
Filed Sept. 14, 1960 5 Sheets-Sheet 3
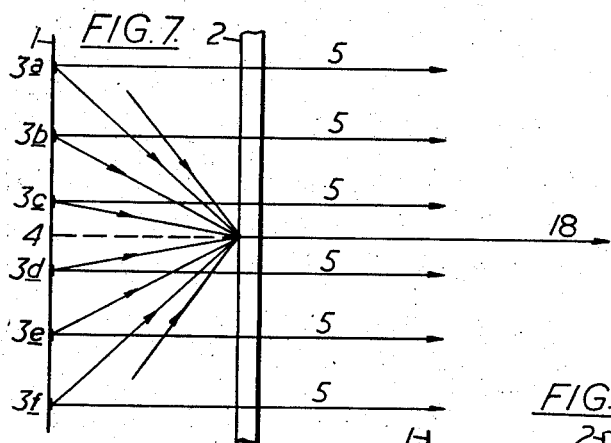
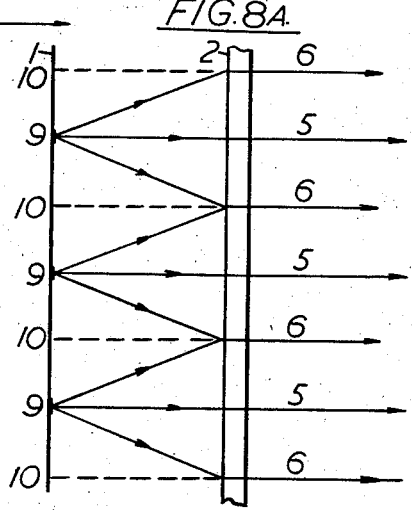
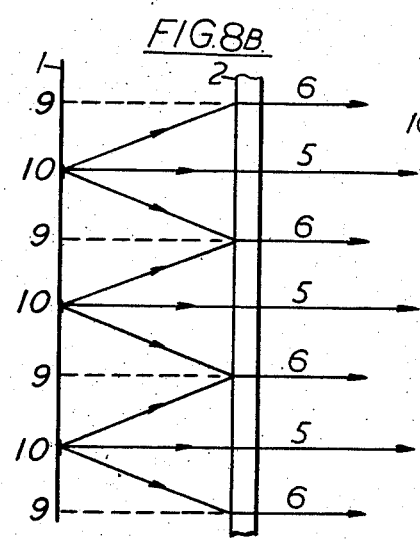
Inventor
David George Brake
by Robert Cushman & Grover
Attorney

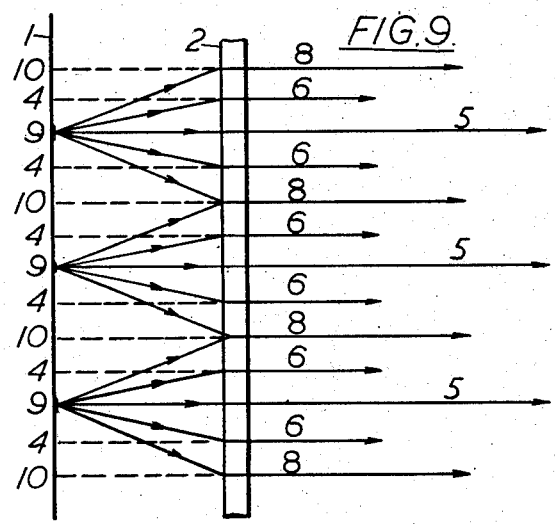
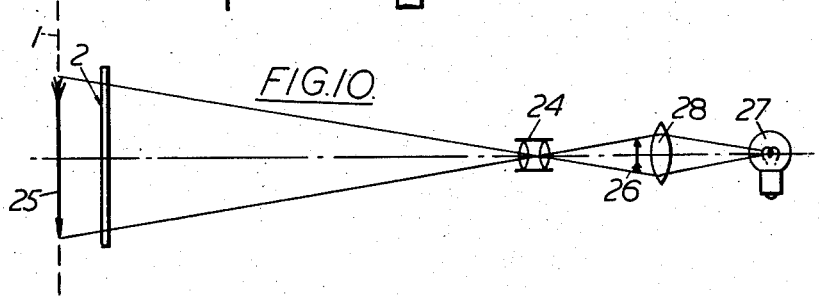
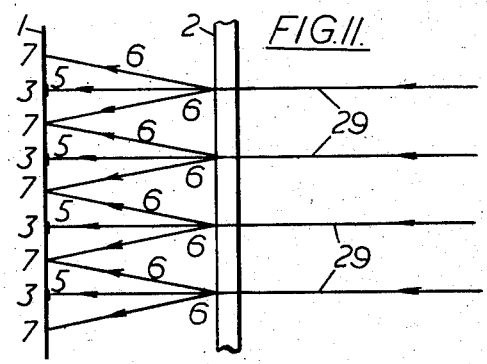

June 25, 1963 D. G. BRAKE 3,095,475
SMOOTHING SPATIALLY DISCONTINUOUS IMAGES
Filed Sept. 14, 1960 5 Sheets-Sheet 5

Inventor
David George Brake
by Robert ƒ
Attorney

United States Patent Office 3,095,475
Patented June 25, 1963

3,095,475
SMOOTHING SPATIALLY DISCONTINUOUS IMAGES
David George Brake, Langley, England, assignor to Technicolor Corporation of America, a corporation of Maine
Filed Sept. 14, 1960, Ser. No. 56,017
8 Claims. (Cl. 178—7.85)

This invention relates to apparatus for reproduction or visible presentation of spatially discontinuous real images.

In certain manners of producing images, the images thus produced are spatially discontinuous, consisting of discrete image elements such as small areas of varied size or brightness, or discrete lines of varied width or brightness, the variations representing the detail of the image. A typical example of such manner of production occurs in television reproducing apparatus in which the image is produced as a series of usually parallel slightly spaced lines in a raster, the brightness being varied along the lines so as to represent the detail of the image. Another example is the reproduction of a photograph or other picture made by one of the screen processes commonly used in the printing trade, such as a half-tone process, in which the image is produced as a series of discrete dots, the brightness or area of the individual dots being varied so as to represent the detail of the image. Yet another example is the images produced from electrical signals, such as telegraphic signals, which, again, comprise a series of discrete lines or dots. The image presentations so produced inevitably suffer from a defect which may be described as a striated or grained effect, which is particularly noticeable if the image is visually perceived at a rather short range. There have previously been proposals for palliating this striated or grained effect, for example, by utilising in a television receiver the technique known as "spot wobble."

One object of the present invention is to provide improved apparatus for reproduction or visible presentation of real images by which the striated or grained appearance of a real image consisting of discrete small areas or discrete lines of varied area, width or brightness is palliated and a semblance of continuity of the image is achieved or approached.

Moreover, in the reproduction of a photograph or other picture comprising a series of discrete lines or dots and resulting for example from a screen printing process or from telegraphic signals by another screening process, there is a liability to the production of "moire" effects. A further object of the invention is to provide means for palliating such "moire" effects.

The invention is also applicable in cases, such as commonly occur in television, in which a resultant image is produced as two or more sets of parallel slightly spaced lines of two or more rasters, the lines of one raster being interleaved with or located in the spaces between the lines of the other or others of the rasters, each such image line of each raster being built up over a short time interval by a scanning operation, the lines of each one of such rasters being built up successively, and each of such complete sets of interleaved raster lines being built up repetitively in successive longer time intervals. In such cases a phenomenon is sometimes perceptible, if and when the focus of attention of an observer travels in the same direction and at the same speed over the image as the sequence of the build up of the sets of lines of each of the interleaved rasters, namely, the perception of apparent lines corresponding in number to the number of lines in one of the interleaved rasters, such apparent lines appearing to proceed relatively slowly in a direction perpendicular to their length. A further object of the invention is to palliate this phenomenon.

The present invention consists in the combination with means for producing at an image surface a real spatially discontinuous image consisting of discrete image elements of optically diffracting means having a periodic optical variation on an axis along which the said real image is spatially discontinuous so as to produce from each pencil of light incident thereon at least two diffracted pencils of emergent light corresponding respectively to different orders of diffraction (one of which may or may not be the zero order), such diffracting means being disposed at such a distance from the image surface that at least two resultant images of every image element, each corresponding to at least one of the said diffracted pencils, are produced at the image surface. The invention thus, in one of its forms when the zero order diffracted pencils are utilized, increases the apparent number of discrete image elements by interpolating, between the positions that are occupied by the elements (or images of them) of the original image, additional resultant images to the brightness of which contributions are made by non-zero order diffracted pencils of light associated with one or more proximate elements of the original image. In cases when the zero order diffracted pencils are, as they may be, suppressed, the number of resultant images produced is at least an integral multiple of the number of original discrete image elements.

If the diffracting means has, as it may have, also refracting properties affecting the zero order diffracted pencils, such will cause a shift of the apparent positions of the discrete image elements from the positions that they would have occupied in the absence of the diffracting means.

The diffracting means itself may be of any known form comprising closely pitched elements of differing optical properties, which may, but need not, be arranged in a pattern or configuration similar to that of the discrete image elements. For example, in the case of an image in the form of a television or like raster, consisting of parallel slightly spaced lines, the diffracting means may comprise a plurality of parallel adjacent narrow bands of different optical properties, these bands being arranged parallel with or at a small angle to the lines of the image raster. In the case of an image that consists of discrete dots, like a screen-printed or half-tone picture, the diffracting means may comprise two sets of parallel adjacent narrow bands of different optical properties, arranged with the bands of each set perpendicular to those of the other set. In the case of an image consisting of concentric circular lines or a spiral line, the diffracting means may comprise concentric or spiral bands of different optical properties. Broadly stated, the requirement is that the diffracting means should have a periodic optical variation of suitable pitch on an axis along which the original image is made up of discrete image elements. Be it noted that the pitch of the elements or bands of the diffracting means is preferably small and bears no necessary relation to the spacing of the discrete elements of the image, except that, in order to minimize "moire" effects, the pitch of the elements of the diffracting means should be a small fraction, for example one tenth, of the pitch of the discrete image elements. The diffracting means may be of the common type comprising alternate bands respectively attenuating transmitted light differently, for example alternate opaque and transparent bands, such as may be referred to as an "amplitude modulating grating." It may, however, be of the "phase-change" type, that produces different changes of phase in light pencils passing through different bands thereof, in which different bands either the length of light path through or refractive index of the transparent material of which the diffracting means consists differs from band to band. The change of attenuation or phase-change between band and band need not be abrupt. Indeed, in some cases a change following a sine form across the bands of the device may be preferable. Furthermore, the diffracting means might well combine the properties of amplitude modulation and phase-change. Moreover, it may be of the type known as blazed, which is described under the term "prismatic" in "Physical Optics" by R. W. Wood, 1911 edition, on page 226. It may be so chosen as to transmit predetermined and different proportions of light energy in the diffracted pencils of different orders. In many cases, for example, it may be desirable that the distribution of energy among the diffracted pencils of the zero and higher orders be such that the brightness of all the resultant images produced are approximately equal. Indeed, all diffracted pencils of order higher than the first may be suppressed and the light energy from any discrete image element may be divided between the zero order pencil and the two first order diffracted pencils. In this case, if two apparent image elements are to be formed corresponding to each element of the original image, the energy in the zero order pencil may be equal to the sum of the energies in the two first order pencils. The design of diffracting means to distribute the incident light energy as desired among the diffracted pencils of various orders is understood and forms no part of the present invention. It will, of course, be appreciated that the elemental image perceived due to each diffracted pencil, except the zero order pencil, comprises a spectrum, but of such small dispersion as to be imperceptible.

It is usually convenient to dispose the diffracting means between the real image surface and the observer or the lens of a copying camera, projector or the like, in which case the real image surface may be of the nature of a television receiver screen, an illuminated screen-printed picture or a tele-photograph. However, when the real image is formed optically in the image surface (which may be merely a surface in space) for example by optical projection, the diffracting means may be disposed on the side of the image surface upon which an image-bearing beam falls.

When the diffracting means is disposed between the real image surface and the observer or camera or the like, at least two spaced emergent pencils of light corresponding to at least two diffracted orders (one of which may be the zero order) are produced at the diffracting means from light emanating from each image element and impinging on the diffracting means, and at least two images of an image element are apparent at the image surface corresponding to at least two diffracted orders.

Except in the case of monochromatic light, each of the resultant images corresponding to non-zero order diffracted pencils, of course, comprises a spectrum which is too small usually to be resolved by the eye into its different colour bands. Thus in most cases, the eye will appreciate the original image element by virtue of the zero order diffracted pencil, and at least one resultant image for every utilized higher order of diffraction (some of which resultant images may be superimposed upon one another). The resultant images may be produced as the result of combinations of pencils of different diffraction orders originating at different sources.

In the case of projecting a real image, the diffracting means may be located between the projecting optical system and the surface in which the real image is formed. In this case at least two angularly spaced emergent pencils of light corresponding to at least two diffracted orders (one of which may be the zero order) are produced at the diffracting means from light incident thereon, and at least two images are produced at the image surface corresponding to at least two diffracted orders corresponding to each image element that would be produced in the absence of the diffracting means.

The invention includes, as a particular case, the combination with a television receiver, having a screen upon which a real luminiferous spatially discontinuous image is produced in the form of a line raster, of diffracting means spaced from and extending over the area of the screen, this diffracting means being a plate of which the optical properties vary periodically in a direction substantially perpendicular to the lines of the raster with a pitch that is a fraction of the pitch of the lines of the raster.

For the better understanding of the invention, certain particular manners of putting it into practice will now be described with reference to the accompanying purely diagrammatic drawings, in which:

FIG. 1 illustrates a conventional television receiver combined with optical diffracting means in accordance with the invention:

FIG. 2 is a fragmentary diagrammatic cross-section through a portion of the image plane, for example, the fluorescent screen of the television receiver illustrated in FIG. 1, and through a portion of the diffracting means, and illustrates the paths of typical light rays in a case in which zero order rays from the original image elements are utilized and in which first order diffracted rays from adjacent original image elements combine to interpolate single added apparent image elements between each pair of adjacent original real image elements.

FIG. 3 is a fragmentary diagrammatic cross-section similar to FIG. 2, for a case in which zero order rays from the original image elements are utilized, and in which the first order diffracted rays from each pair of adjacent original image elements, serve to interpolate separately apparent image elements between the original image elements of the pair:

FIG. 7 is a diagrammatic cross-section similar to FIG. 1 illustrating a case in which zero, first, third, fifth and higher odd orders of diffracted rays are utilized, the added apparent image elements being formed by the addition of two of each of the odd non-zero orders of diffracted rays:

Figure 12:
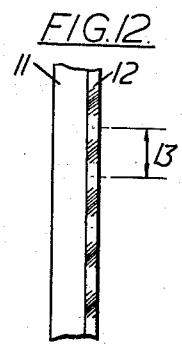
Figure 13:
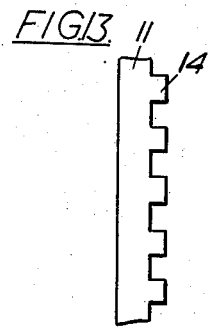
Figure 14:
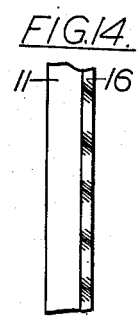
Figure 15:
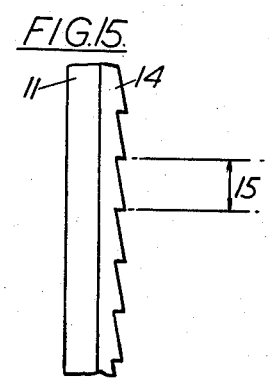

FIGS. 8A and 8B are fragmentary diagrammatic cross-sections similar to FIGS. 2, 3, 4 and 5, illustrating a case wherein the original spatially discontinuous image is constituted by two spatially interlaced sets of lines formed by two scanning rasters that may be successive in time, the derived apparent image lines corresponding to the original image lines of each raster being superimposed upon the original image lines of the other raster:

FIG. 9 is a similar diagrammatic cross-section illustrating the formation, by second order diffracted rays, of apparent image elements derived from each one of two interlaced rasters in the positions occupied by those of the other of the interlaced rasters, together with the formation by first order rays of added apparent image elements:

FIG. 10 is a diagram illustrating an arrangement for projecting a real image in which the diffracting means is located between a projecting optical system and a surface in which the real image is formed:

FIG. 11 is a diagrammatic cross-section, similar to FIG. 2, illustrating the formation by first order diffracted rays from adjacent image elements to interpolate single added real image elements between each pair of adjacent original real image elements:

FIG. 12 is a diagrammatic cross-section illustrating a fragment of diffracting means comprising alternate bands respectively attenuating transmitted light differently:

FIG. 13 is a similar fragmentary cross-section of diffracting means of the "phase-change" type:

FIG. 14 is a similar fragmentary diagram illustrating a "phase-change" diffracting means utilizing alternate bands respectively having different refractive indexes; and FIG. 15 is a similar fragmentary diagram illustrating a typical "phase-change" diffracting means of the form known as "blazed."

In all the figures of the accompanying drawings the dimensions and proportions illustrated have no significance, the drawings being entirely diagrammatic and qualitative in nature.

Referring now to FIG. 1 of the accompanying drawings, a conventional television receiver indicated generally at 20 comprises the conventional electrical equipment for producing on a luminiferous screen 22 of a cathode ray tube 21 a real spatially discontinuous luminiferous image consisting of discrete image elements. In the case of a conventional television receiver the real spatially discontinuous image consists of a considerable number of spaced lines of varying brightness. This real original image on the screen 22 is normally viewed directly by an observer indicated by the eye 23. The observer will, if rather close to the screen 22, perceive the separate lines of which the complete original real image on the screen 22 is made up. Thus the presentation perceived by the observer will suffer from what may be described as a striated or grained effect.

In order to palliate the perception of this striated or grained effect, according to the invention, there is combined with the television receiver 20 having the screen 22, at which is produced a real spatially discontinuous image consisting of discrete image elements, optical diffracting means 2 having, as will hereinafter be explained in detail, periodic variation of optical properties along an axis along which the real image on the screen 22 is discontinuous, that is along an axis oblique to and preferably perpendicular to the lines of which the real image is made up. The diffracting means 2 is such as to produce from each pencil of light incident thereon at least two emergent pencils of light corresponding respectively to different orders of diffraction (one of which orders may or may not be the zero order). The diffracting means 2 is disposed at such a distance from the luminiferous screen 22 that at least two resultant images of every image element are produced, each such resultant image corresponding to at least one of the said diffracted pencils of emergent light.

It is a property of optical diffracting elements as used according to the invention to disperse light in a highly regular manner. Monochromatic light incident normally to the plane of the diffracting elements is diffracted at certain sharply defined angles to the incident beam, which angles are determined by the spacing of the diffracting discontinuities and the wavelength of the incident light. The proportion of the incident energy which is directed in any particular angle is dependent upon the nature and configuration of the individual diffracting discontinuities. By this reasoning it may further be understood that a pencil of light incident upon a plane diffracting element at one of these particular angles will have at least a portion of its energy diffracted perpendicular thereto.

Each of the discrete image elements making up a television picture emits light over a quite broad angle. If some of the light emitted at a given oblique angle to the image surface is allowed to proceed for a short distance at its original angle and is then diffracted to the nominal viewing angle (perpendicular to the screen) there will be created a visual duplicate of the original image element, which duplicate is laterally shifted with respect to the original. The amount of shift is dependent upon the distance which the light traverses before being diffracted, nominally the distance between the image surface and the diffracting element, and the angle at which the diffracting element will deflect the particular light. As stated previously this latter characteristic is determined by the spacing of the dispersive discontinuities in the diffraction element.

In FIG. 2 are shown the optical parts of selected light rays emanating originally from original discrete image elements 3 in an image plane 1 that, in the embodiment of FIG. 1, corresponds to the fluorescent screen 22. As shown in FIG. 2, from each pencil of light emanating from any original image element 3 and traversing the diffracting means 2, that corresponds with the diffracting means 2 of FIG. 1, zero order diffracted rays 5 and two first order diffracted rays 6 are derived. The spacing of the diffracting means 2 from the image plane 1 is such that one of the first order diffracted rays from light pencils originating at each of adjacent original image elements 3 combine to interpolate an apparent image element at 4 between the two said adjacent original image elements 3. This arrangement thus utilizes the zero order and first order diffracted rays only, and interpolates in the image plane 1 one apparent additional image element between every two of the original real image elements.

In the arrangement illustrated in FIG. 3, from each pencil of light emanating from any original image element 3 are, again, derived zero order diffracted rays 5 and first order diffracted rays 6. However, in this case the spacing of the diffracting means 2 from the image plane 1 is such that the apparent images formed by the first order diffracted rays 6 from light pencils emanating at each of adjacent original image elements 3 are not combined but are slightly spaced apart but between the said adjacent original image elements. Thus this arrangement utilizes zero order and first order diffracted rays only and interpolates in the image plane 1 two apparent additional images at 4a and 4b between every two of the original real image elements.

Figure 4:
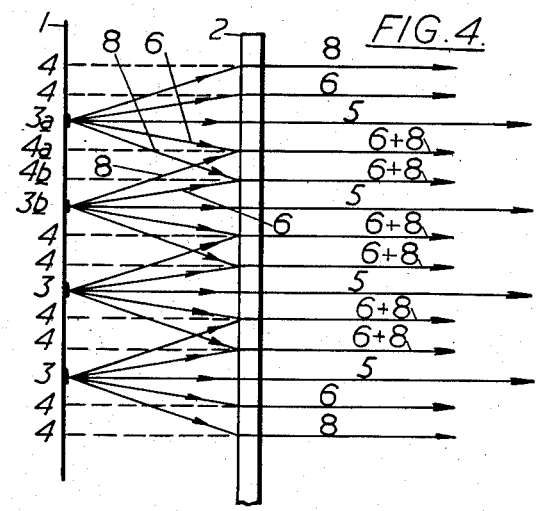
FIG. 4 is a fragmentary diagrammatic cross-section, similar to FIGS. 2 and 3 illustrating the utilization of zero, first order and second order diffracted rays.

In the arrangement illustrated in FIG. 4, from each pencil of light emanating from any original image element 3, are derived zero order, first order and second order diffracted rays, each added apparent image element 4 being formed by the combination of first order diffracted rays from one original image element 3 and second order diffracted rays from an adjacent original image element. Moreover, two additional apparent image elements 4 are interpolated between each pair of adjacent original image elements 3. Thus the additional apparent image element 4a is contributed to by one of the two first order diffracted rays 6 originating at the original image element 3a and by one of the two second order diffracted rays 8 originating at the original image element 3b, so that the resultant ray marked on the drawing as 6+8 is produced. Likewise the additional apparent image element 4b is contributed to by one of the two second order diffracted rays 8 originating at the original image element 3a and one of the two first order diffracted rays 6 originating at the original image element 3b. The original image elements 3 are perceived by the zero order diffracted rays 5.

Figure 5:
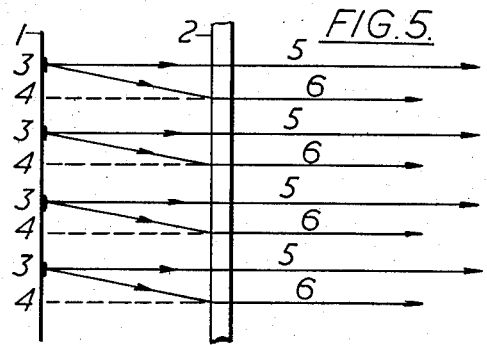
FIG. 5 is a fragmentary diagrammatic cross-section similar to FIGS. 2, 3 and 4, demonstrating the utilization of a blazed diffraction means that produces zero order and first order diffracted rays each at one angle only to the normal to the plane of the diffraction means to form the added or interpolated image elements.

In the arrangement illustrated in FIG. 5, a "blazed" diffraction means 2 produces from the light pencil issuing from each of the original image elements 3 a zero order ray 5 and a single first order diffracted ray 6. The original image elements 3 are perceived by the zero order diffracted rays 5 and additional apparent image elements 4 are interpolated by the first order diffracted rays 5.

Figure 6:
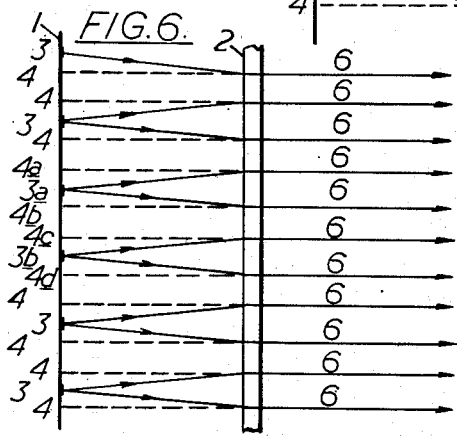
FIG. 6 is a fragmentary diagrammatic cross-section similar to FIGS. 2, 3, 4 and 5, illustrating a case wherein the zero order diffracted rays are suppressed and the first order diffracted rays originating at adjacent original image elements form additional image elements between the positions of the real original image elements.

In the arrangement illustrated in FIG. 6, the diffracting means 2 is such as to suppress zero order diffracted rays and to produce the pair of first order diffracted rays 6. The diffracting means 2 is placed at such a distance from the original real image plane 1 that two additional apparent images 4 are formed between the positions of each pair of adjacent original real images 3. Thus, from the light emanating from the original image element 3a, an emergent ray 6 is formed to produce additional apparent image elements 4a and 4b; and light from the adjacent original image element 3b provides additional apparent image elements 4c and 4d. The additional apparent image elements 4b and 4c are side by side and between the positions of the original real image elements 3a and 3b, which latter, owing to the suppression of the zero order diffracted rays, are not perceived. Thus the apparent number of image elements perceived is doubled.

However diffraction gratings that produce first order diffracted rays usually produce also some higher odd orders of diffracted rays of lower energy content. Thus in the arrangement of FIG. 6 third order diffracted rays (not shown) which may have appreciable energy content, will produce apparent image elements superposed upon the additional apparent image elements 4.

In the arrangement illustrated in FIG. 7, diffracting means 2 is such as to produce the zero order, first order, third order and fifth order (and even higher orders) of diffracted rays. In this case the distance between the diffracting means 2 and the real image plane 1 is such that each additional apparent image element is contributed to by diffracted rays emanating originally from numerous consecutive original image elements. Each of the original image elements 3a to 3f is perceptible by the zero order diffracted rays 5. In the drawing the interpolation of only one additional apparent image at 4, between the original image elements at 3c and 3d, is shown, it being understood that similar additional apparent image elements will be interpolated between the original image elements 3a and 3b, 3b and 3c, 3d and 3e and 3e and 3f. The emergent ray 18 corresponding to the additional apparent image at 4 is contributed to by the first order diffracted rays emanating originally from real image elements 3c and 3d, third order diffracted rays from 3b and 3e, and fifth order diffracted rays from 3a and 3f.

In FIG. 8A and FIG. 8B is illustrated the application of the invention to a case, such as commonly occurs in television receivers, in which a resultant original real image is produced as two sets of parallel slightly spaced lines of two rasters, the lines 9 of one raster being interleaved with or located in the spaces between the lines 10 of the other raster. The arrangement illustrated in FIGS. 8A and 8B serves to palliate the phenomenon previously referred to in which, if and when the focus of attention of an observer travels in the same direction and at the same speed over the image plane 1 as the sequence of the build up of the sets of lines of each of the interleaved rasters, the observer perceives apparent lines corresponding in number to the number of lines in one only of the interleaved rasters, such apparent lines appearing to proceed slowly in a direction perpendicular to their length. In this case the additional apparent images derived from the original real line images of each raster are interpolated between the adjacent lines of that raster and superimposed upon or closely adjacent to the original real lines images of the other raster.

In FIG. 8A is diagrammatically illustrated the formation of additional apparent images at 10 from light emanating from the lines at 9 of one of the rasters by diffracting means 2 such as to produce from light incident thereon zero order diffracted rays 5 and first order diffracted rays 6. The original image lines of the said other raster appear, of course, in the image surface 1 at 10 as shown in FIG. 8B. Likewise the diffracting means 2 as shown in FIG. 8B, produces from the original image lines at 10 of the second raster additional apparent images at or close to 9 at the image plane 1. The original real image lines of each raster are perceptible by the emergent zero order diffracted rays 5, and the additional apparent images interpolated between the original real image lines of one raster and superimposed on (or nearly so) the original real image lines of the other raster are perceptible by the first order diffracted rays 6.

FIG. 9 is similar to FIG. 8A and illustrates another case of the application of the invention to an original real image consisting of the lines of two interleaved rasters, and illustrates the interpolation at 4 of additional apparent image elements, as well as the superposition of additional apparent image elements derived from one raster at the positions 10 of the real image lines of the other raster, both derived from the lines at 9 of one of the two rasters. In this case the diffracting means 2 is such as to produce from light incident upon it zero order, first order and second order diffracted rays of useful energy content. The original real image elements at 9 are perceptible by the zero order diffracted rays 5. The second order diffracted rays 8 provide apparent images at 10 that are superposed upon the real images of the other raster. Additional apparent images are formed at 4 by the first order diffracted rays 6.

FIG. 10 illustrates diagrammatically one form of arrangement for projecting a real image in which the diffracting means 2 is located between an optical projection system comprising a projecting objective lens 24 by which a real image 25 of an object 26 is projected upon an image plane 1. Such an arrangement is suitable for reproduction of a photograph or other picture made by one of the screen processes, such as a half-tone process, in which the original image is made up of a series of discrete dots; or for the reproduction of images produced from electrical signals, such as telegraphic signals which, again, comprise a series of discrete lines or dots. As shown, the original picture or the like 26, assumed to be transparent, is illuminated by means of a light source 27 and condensing lens 28. The objective lens 24 produces a real image 25 of the picture 26 in the image plane 1. Diffracting means 2 is disposed near the image plane 1. The diffracting means 2 may be such that at such distance from the image plane 1 as to function analogously to any one of the manners described with reference to FIGS. 2, 3, 4, 5, 6, 7, 8 and 9, except that the added apparent images will be real. An example is illustrated in FIG. 11. As shown in FIG. 11, the rays 29 of the image-bearing beam from the objective lens 24 are diffracted by the diffracting means 2 to provide zero order diffracted rays 5 and first order diffracted rays 6. The zero order diffracted rays 5 form real images at 3 in the image plane 1 corresponding with the image elements of the picture or the like 26. The diffracted rays 6 form additional real images at 7 in the image plane 1. Such a disposition of the diffracting means 2 relatively to the real image plane 1 is also applicable to television receivers of the projection type.

In FIG. 12 is shown, on a very greatly enlarged scale and purely diagrammatically, a cross-section of one form of diffracting means comprising a plurality of parallel adjacent bands of different optical properties that may be used in the arrangements of FIGS. 2, 3, 4, 7, 8A and 8B, 9 and 11.

The diffracting means here shown is a simple "amplitude" diffraction grating comprising a thin lamina 12 of light transmitting material which is usually but not necessarily carried by a transparent support 11. The lamina 12 may indeed be a layer of photographic emulsion, so exposed and developed that it has parallel adjacent bands that exercise different degrees of attenuation of incident light.

The pitch $p$, indicated by the distance 13 in FIG. 12 of the grating has no necessary particular relationship to the pitch of the original image elements, but should preferably be not greater than of the order of one-tenth of the pitch of the original image elements. An amplitude grating suitable for use may consist of alternate transparent and opaque bands, but its attenuation of light incident upon it may vary continuously, for example sinusoidally, as indicated by variation of the closeness of hatching in FIG. 12. If the attenuation varies abruptly from a minimum in one band to a maximum in the adjacent band, as in a "bar-and-slit" grating, the grating produces the zero order, first orders, third orders and higher odd order of diffracted rays. If the attenuation varies sinusoidally, the grating produces zero and first order diffracted rays.

Another suitable form of diffracting means is diagrammatically illustrated in FIG. 13. In this form the diffracting means is of the "phase-change" type comprising a serrated transparent lamina 14, which may or may not be carried by a transparent support 11. The thickness of the lamina is changed from a minimum to a maximum periodically across the grating, the serrations may be rectangular or nearly so or may be continuous, for example sinsuoidal. With rectangular serrations, if the amplitude of the serrations is such as to produce a phase difference of $\pi/2$ radians or one-quarter of the wavelength of the incident light, the grating produces the zero order and odd orders of diffracted rays. If the amplitude of the serrations is $\pi$ radians or one-half of the wavelength of the incident light, the zero order diffracted rays are suppressed and odd orders of diffracted rays will be produced. This type of diffraction grating is suitable for use in the arrangements illustrated in FIGS. 2, 3, 4, 6, 7, 8A and 8B, 9 and 11.

FIG. 14 illustrates diagrammatically another suitable form of phase change diffraction grating. In this grating a transparent lamina 16, which may or may not be carried by a transparent support 11, is of constant thickness but the refractive index varies continuously, as indicated by the variation of hatching, from a maximum to a minimum periodically across the grating. Such a phase change grating is suitable for use in the arrangements of FIGS. 2, 3, 4, 6, 7, 8A and 8B, 9 and 11.

A suitable form of "blazed" diffraction grating is shown in FIG. 15. This grating comprises a transparent lamina 14, which may or may not be carried on a transparent support 11 and varies in thickness periodically so that one surface has, in section, a sawtooth configuration as indicated in FIG. 15. This form of diffraction grating is useful in the arrangement illustrated in FIG. 5. Its properties are adequately described in "Physical Optics" by R. W. Wood, previously referred to.

It will be appreciated that the diffracting means 2 may combine the properties of any two or more of the several particular types specifically referred to.

It can be shown that, when the medium between the real image surface and the effective surface of the diffracting means has a refractive index of $\mu$, for viewing or projecting normally to the real image surface and to the effective surface of the diffracting means, and distances S between the real image surface and the effective surface of the diffracting means is given by the equation:

$$S \simeq \frac{RP\mu}{X.Q.\lambda} \quad (1)$$

where R is the pitch of the original image elements (or, where it is desired, in the case of interleaved rasters as previously mentioned, to palliate the perception of an apparent number of line image elements corresponding to the number of lines in one only of the interleaved rasters, R is the pitch of each of the separate rasters), P is the pitch of the individual elements of the diffracting means (measured in the same direction as the dimension R), Q is the number of discrete appreciable image elements in the modified image produced for each element of the original image, $\lambda$ is the wavelength or mean wavelength, in vacuum of the light forming the image, and X is the minimum numerical algebraic difference between the numbers of the orders of the diffracted rays of useful energy content.

If the medium of refractive index $\mu$ fills only part of the space between the real image surface and the effective surface of the diffracting means which is otherwise filled by layers of other media of thicknesses $T_1$, $T_2$, ... $T_n$, having refractive indexes $\mu_1$, $\mu_2$, ... $\mu_n$, respectively, the boundary surfaces between each layer being parallel to the real image surface and to the effective surface of the diffracting means then:

$$S \simeq \frac{RP\mu}{X.Q.\lambda} + T_1\left(1 - \frac{\mu}{\mu_1}\right) + T_2\left(1 - \frac{\mu}{\mu_2}\right) + \cdots T_n\left(1 - \frac{\mu}{\mu_n}\right)$$

In a particular example of the invention, a real image, radiating light having a mean wavelength equal to 0.0005 mm. on the inner face of a television picture tube is composed of discrete lines of varying brightness having a pitch R equal to 0.6 mm. The face of the tube is composed of glass of refractive index $\mu_1$ equal to 1.52 and thickness $T_1$ equal to 10 mm. A diffracting grating is mounted in front of the tube face, the effective surface of which is at a distance S from the real image surface. The effective surface of the grating is formed on the surface of a glass plate of refracting index $\mu_2$ equal to 1.56 and thickness $T_2$ equal to 4.5 mm. this plate filling part of the space between the effective grating surface and the tube face which otherwise is filled with air having a refractive index $\mu$ equal to unity. The diffracting grating has a pitch P equal to 0.05 mm. and is of a form which produces useful energy in the zero and first orders. Thus X is equal to 1. Two lines are required in the modified image for every line of the original image. Q is therefore equal to 2.

Then:

$$S \simeq \frac{0.6 \times 0.05 \times 1}{1 \times 2 \times 0.0005} + 10\left(1 - \frac{1}{1.52}\right) + 4.5\left(1 - \frac{1}{1.56}\right) \text{ mm.}$$

$\simeq 35$ mm.

Although the formula set out above defines a theoretically ideal spacing of the diffracting means from the real image surface, the distance between the diffracting means and the real image surface may be varied substantially.

What I claim is:

1. In combination with means for producing at an image surface a real spatially discontinuous image including discrete image elements, optical diffracting means having periodic optical variation on an axis along which the said real image is discontinuous so as to produce from each pencil of light incident thereon at least two pencils of emergent light, said diffracting means being disposed at such a distance from the image surface that at least two resultant images of every image element, each corresponding to at least one of the said pencils, are produced.

2. The combination claimed in claim 1 wherein the optical diffracting means comprises closely pitched elements of differing optical properties arranged in a pattern similar to that of the discrete image elements of the said real image.

3. The combination claimed in claim 2 wherein the pitch of the closely pitched elements is small as compared with the pitch of the discrete image elements of the said real image.

4. The combination claimed in claim 1 wherein said diffracting means is disposed between the real image surface and the observer.

5. The combination claimed in claim 1 wherein the real image is formed in the image surface by optical projection, and wherein the diffracting means is disposed on the side of the image surface upon which the image-bearing beam falls.

6. In combination with a television receiver having a screen upon which a real luminiferous spatially discontinuous image is produced in the form of a line raster, diffracting means spaced from and extending over the area of the screen, said diffracting means being a plate of which the light transmissive properties vary periodically in a direction substantially perpendicular to the lines of the raster with a pitch that is small as compared with the pitch of the lines of the raster.

7. In combination with means for producing at an image surface a real spatially discontinuous image including discrete image elements, optical diffracting means having periodic optical variation on an axis along which the real image is discontinuous for creating from each image element a duplicate image which is laterally displaced from the original image element.

8. In combination with means for producing at an image surface a real, spatially discontinuous image including regularly spaced discrete image elements, optical diffracting means having periodic optical variation on an axis along which the real image is discontinuous for creating from each image element a duplicate image which is located between the original and an adjacent image element.

References Cited in the file of this patent

UNITED STATES PATENTS

| | | |
|---|---|---|
| 2,201,245 | Ruska | May 21, 1940 |
| 2,207,835 | Sukumlyn | July 16, 1940 |
| 2,415,211 | Law | Feb. 4, 1947 |
| 2,459,637 | Frihart | Jan. 18, 1949 |
| 2,531,399 | Cawein | Nov. 28, 1950 |
| 2,612,611 | Szegho | Sept. 30, 1952 |
| 2,728,013 | Tourshou | Dec. 20, 1955 |
| 2,746,030 | Schrecongost | May 15, 1956 |